(12) United States Patent
Wang et al.

(10) Patent No.: US 7,460,147 B2
(45) Date of Patent: Dec. 2, 2008

(54) INTERFERENCE DETECTING CIRCUIT UTILIZING SYNCHRONIZATION SYMBOLS AND METHOD THEREOF

(75) Inventors: Wei-Ting Wang, Taipei (TW); Cheng-Yi Huang, I-Lan Hsien (TW); Bao-Chi Peng, Taipei (TW)

(73) Assignee: Realtek Semiconductor Corp., HsinChu (TW)

( * ) Notice: Subject to any disclaimer, the term of this patent is extended or adjusted under 35 U.S.C. 154(b) by 584 days.

(21) Appl. No.: 11/160,553

(22) Filed: Jun. 28, 2005

(65) Prior Publication Data
US 2006/0007299 A1    Jan. 12, 2006

(30) Foreign Application Priority Data
Jul. 6, 2004    (TW) .............................. 93120242 A

(51) Int. Cl.
    *H04N 5/38*    (2006.01)
(52) U.S. Cl. ........................... 348/21; 348/607; 375/346
(58) Field of Classification Search .................. 348/21, 348/607, 470, 611, 613, 473, 726, 558, 555; 375/346, 349, 350, 351, 365–378, 348
    See application file for complete search history.

(56) References Cited
    U.S. PATENT DOCUMENTS
    5,594,496 A * 1/1997 Nielsen et al. ................. 348/21

| | | | |
|---|---|---|---|
| 5,978,424 A * | 11/1999 | Turner | 375/368 |
| 6,023,306 A * | 2/2000 | Limberg | 348/726 |
| 6,201,576 B1 | 3/2001 | Raghunath et al. | |
| 6,233,295 B1 | 5/2001 | Wang | |
| 6,266,380 B1 | 7/2001 | Wang | |
| 6,356,598 B1 | 3/2002 | Wang | |
| 6,519,298 B1 * | 2/2003 | Kim | 375/343 |
| 6,693,958 B1 | 2/2004 | Wang et al. | |
| 6,697,098 B1 | 2/2004 | Wang | |

OTHER PUBLICATIONS

Guide to the Use of the ATSC Digital Television Standard, Advanced Television Systems Committee, Oct. 4, 1995. pp. 1-36.
ATSC standard: Digital Television Standard, Revision B with Amendments 1 and 2, Advanced Television Systems Committee, Aug. 7, 2001, pp. 1-92, Washington, D.C. U.S.A.

* cited by examiner

*Primary Examiner*—M. Lee
(74) *Attorney, Agent, or Firm*—Winston Hsu

(57) ABSTRACT

An interference detecting circuit for use in an ATSC system and for detecting interference of an ATSC signal includes: a buffering module for delaying to output a first PN63 synchronization format data when receiving the first PN63 synchronization format data; a correlation arithmetic circuit coupled to the buffering module for receiving the ATSC signal and performing a correlation operation on a second PN63 synchronization format data and the delayed first PN63 synchronization format data to output a detection signal when receiving the second PN63 synchronization format data; and a determining circuit for determining whether performing interference rejection on the ATSC signal or not according to the result of the above-mentioned correlation operation.

23 Claims, 3 Drawing Sheets

INTERFERENCE DETECTING CIRCUIT UTILIZING SYNCHRONIZATION SYMBOLS AND METHOD THEREOF

BACKGROUND OF THE INVENTION

1. Field of the Invention

The present invention relates to an interference detecting circuit and method thereof, and more particularly, to an interference detecting circuit utilizing synchronization symbols and method thereof suitable for a digital TV system.

2. Description of the Prior Art

Please refer to FIG. 1, which is a diagram showing the specification of a prior art digital TV signal format used in the U.S.A. The digital TV signal used in the U.S.A. complies with the specifications defined by an Advanced Television Systems Committee (ATSC). As defined in the ATSC specification, each field comprises 313 segments and the starting segment of each field is a Field SYNC, which has a known and fixed pattern.

When the ATSC digital TV system and the NTSC analog TV system are broadcasting TV programs simultaneously, it may happen that an ATSC digital TV signal and an NTSC analog TV signal on the same frequency band interfere with each other. Therefore, the ATSC system needs to detect whether the received ATSC digital TV signal has interfered with the NTSC analog TV signal or not. If yes, then the ATSC system has to filter it out; otherwise, the ATSC system omits the filtering process to prevent the final picture quality from being deteriorated by additional interference induced by undesired filtering.

The prior art interference detecting method applied to a digital TV receiver is for comparing the pattern of the received Field SYNC with a known Field SYNC. According to the comparison result, the interference detecting method estimates the seriousness of the interference, and selectively performs interference rejection filtering on the received digital TV signal.

Due to digital TV signals being affected by interference resulting from noise or transmission path variation, the received Field SYNC in the digital TV signal may be distorted. The result is that the digital TV receiver is unable to identify the Field SYNC transmitted by the received digital TV signal, or erroneously activates the interference rejection filtering because of the distortion of the received Field SYNC. Therefore, the prior art interference detection malfunctions.

SUMMARY OF THE INVENTION

It is therefore one of the objectives of the claimed invention to provide an interference detecting circuit and method thereof suitable for an ATSC digital TV system, to solve the above-mentioned problem.

According to a preferred embodiment of the claimed invention, an interference detecting circuit suitable for an ATSC digital TV system is provided to detect to what extent the digital TV signal undergoes interference. The ATSC digital TV signal can be divided into a plurality of fields. Each field comprises at least a plurality of PN63 synchronization format data where each PN63 synchronization format data comprises a plurality of sync symbols. The claimed invention provides an interference detecting circuit, which includes: a buffering module for delaying the first PN63 synchronization format data when receiving it; a correlation arithmetic circuit coupled to the buffering module for receiving the digital TV signal, performing a correlation operation on the second PN63 synchronization format data and the delayed first PN63 synchronization to output a detection signal when receiving the second PN63 synchronization format data; and a determining circuit for determining whether or not to perform interference rejection on the digital signal according to the result of the correlation operation.

Because a plurality of the PN63 synchronization format data in the same field are identical to each other, the claimed apparatus and method selectively perform interference rejection on the digital signal through identifying relative similarity of received PN63 synchronization format data.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
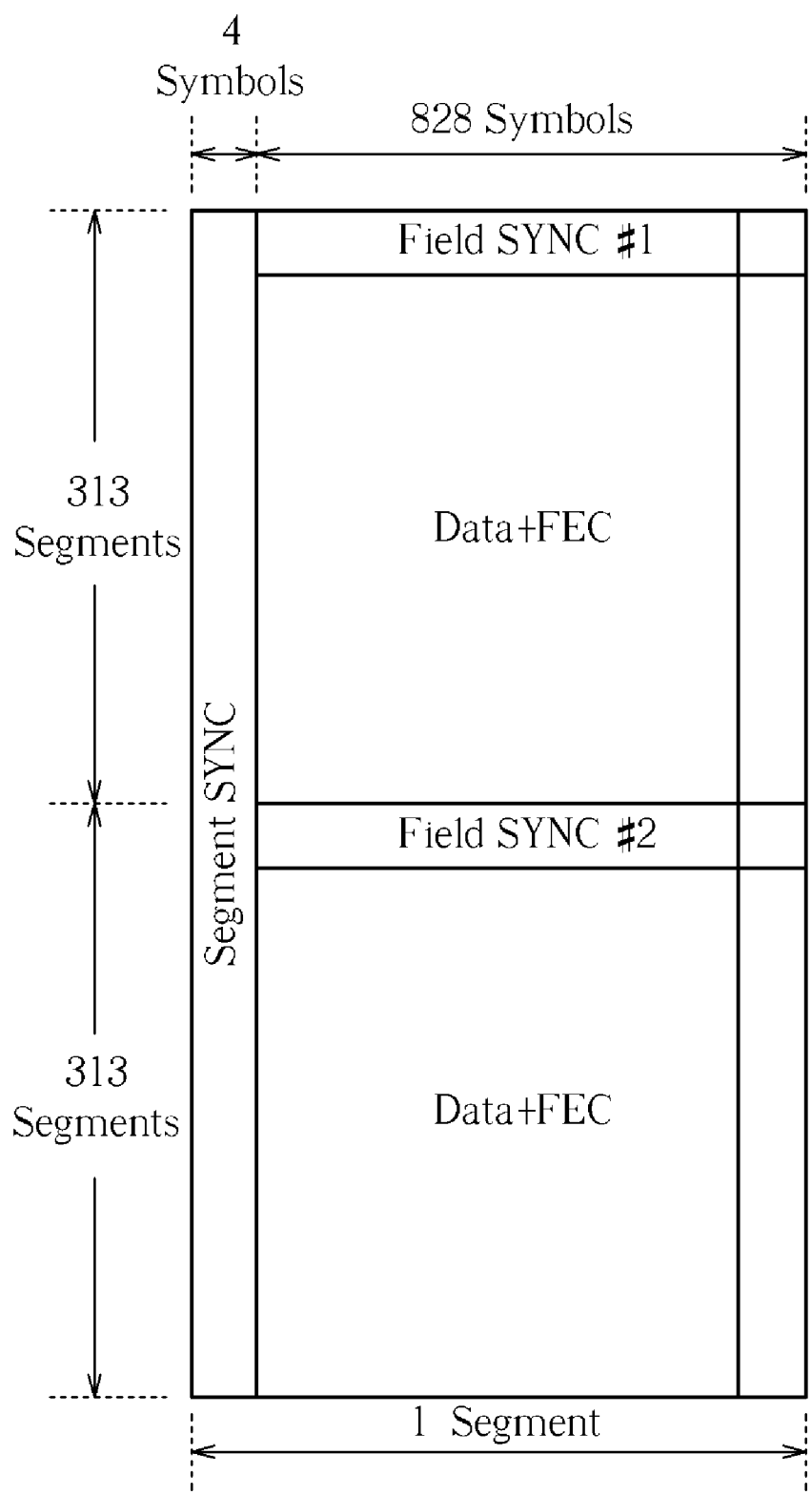
FIG. 1 is a diagram of a prior art ATSC digital TV signal.
Figure 2:
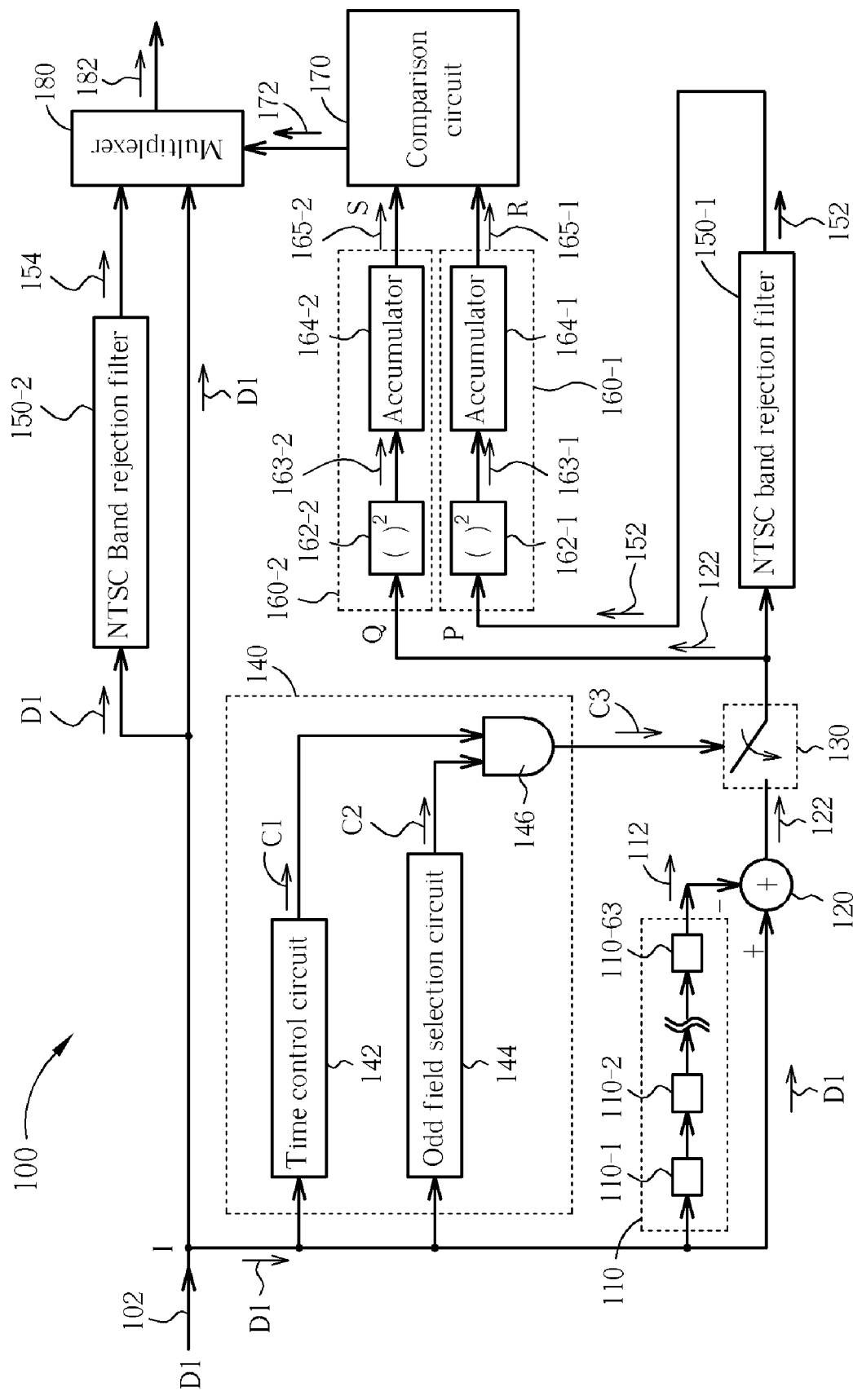
FIG. 2 is a block diagram of an interference detecting circuit according to an embodiment of the present invention.
Figure 3:
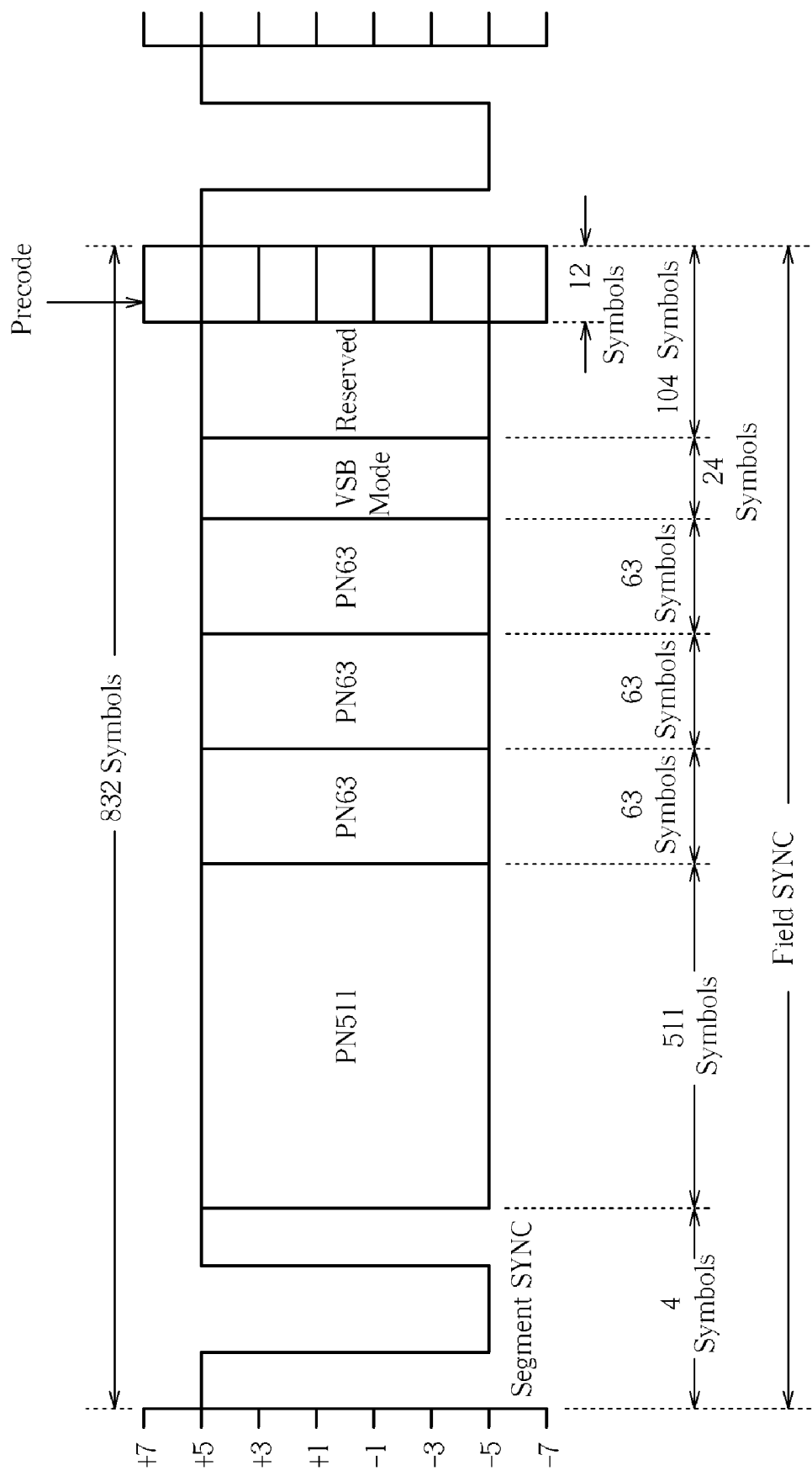
FIG. 3 is a diagram of a Field SYNC processed in the interference detecting circuit shown in FIG. 2.

Please refer to FIG. 2 in conjunction with FIG. 3. FIG. 2 is a block diagram of an interference detecting circuit 100 for an ATSC digital TV system according to an embodiment of the present invention. FIG. 3 is a diagram of a Field SYNC used in an ATSC digital TV system. In this embodiment, the digital signal D1 is an ATSC digital TV signal, that is, the digital signal D1 complies with the specification defined by the Advanced Television Systems Committee (ATSC). According to the specification of ATSC, the data format of Field SYNC, shown in FIG. 3, comprises a PN511 format data containing 511 sync symbols, and three consecutive PN63 format data containing 63 sync symbols. In odd fields these three PN63 format data are the same while in even fields the second PN63 format data is out of phase relative to the first and the third PN63 format data.

As shown in FIG. 2, the interference detecting circuit 100 includes a buffering module 110, an arithmetic circuit 120, a switch 130, a control module 140, a first filter 150-1, a first signal processing module 160-1, a second signal processing module 160-2, a comparison circuit 170, a second filter 150-2, and a multiplexer 180. The buffering module 110 comprises a plurality of registers 110-1 to 110-63 and each one can save one sync symbol. The control module 140 comprises a time control circuit 142, an odd field selecting unit 144, and an AND logic circuit 146. Moreover, the first signal processing module 160-1 comprises a square operator 162-1 and an accumulator 164-1, and the second signal processing module 160-2 comprises a square operator 162-2 and an accumulator 164-2. In this embodiment, the interference signal is an NTSC signal and the filters 150-1 and 150-2 are interference rejection filters corresponding to the spectrum of the NTSC signal for filtering out the unwanted NTSC signal. Since the interference rejection filter is known to those skilled in this art, further description is omitted for brevity. In this embodiment, the NTSC analog TV signal serves as an example of the interference affecting the digital TV signal. However, the present invention is not limited to filtering out the NTSC analog TV signal.

The operation of the interference detecting circuit 100 is detailed as follows. When the digital signal D1 is fed to the input end 102 of the interference detecting circuit 100, the buffering module 110 generates a delayed signal 112 by delaying N sync symbols for a delay time. In this embodiment, N is equal to 63. The arithmetic circuit 120 outputs a detection signal 122 according to the difference between the digital signal D1 and the delayed signal 112. The above-mentioned delayed signal 112 contains M sync symbols out of the original N sync symbols, and the delay time corresponds to the length of the M sync symbols. In this embodiment, M is equal to or less than 63. Since the delayed signal 112 is generated from delaying the digital signal D1 by 63 sync symbols, the operation of the arithmetic circuit 120 is equivalent to comparing M sync symbols within adjacent PN63 format data and then outputting the resultant detection signal 122.

The control module 140 controls the switch 130 according to the digital signal D1 for selectively transmitting the detection signal 122 to both the filter 150-1 and the signal processing module 160-2. As shown in FIG. 2, the control module 140 comprises a time control circuit 142, an odd field selecting circuit 144 and a logic circuit 146. In this embodiment, the odd field selecting circuit 144 judges whether the present digital signal D1 corresponds to an odd field or an even field according to the received digital signal D1. When an odd field is identified by the odd field selecting circuit 144 then the second control signal C2 is outputted. According to the received digital signal D1, the time control circuit 142 generates the first control signal C1 once it starts receiving the second of the above-mentioned three consecutive PN63 format data. The logic circuit 146 performs an AND operation on the control signals C1 and C2 to generate a third control signal C3 used for controlling the switch 130 to allow the detection signal 122 to reach the following signal processing circuits. According to the specification of the ATSC digital TV system, these three PN63 format data of the Field SYNC in the odd field are exactly the same; however, for the even field, the second PN63 format data is out of phase relative to the first and the third PN63 format data. Therefore, in this embodiment, the Field SYNC in an odd field selected by the odd field selecting circuit 144 is used for comparison. In addition, the second and the third PN63 format data in the odd field are selected by the time control circuit 144 for comparison. Please note that the present invention is not limited to the above comparison scheme. Based on the disclosure of the present invention, a skilled person can easily figure out numerous modifications and alterations. For instance, the comparison can be performed during reception of an even field or upon the first and second PN63 format data. For these alternative embodiments, since the operation as well as the implementation of the time control circuit 142 and the odd field selecting circuit 144 are well known to those skilled in this art, further description is omitted for the sake of brevity.

This embodiment illustrates one example of taking an NTSC signal as the interference source of a digital TV signal. Therefore, the first NTSC filter 150-1 is implemented to perform interference rejection filtering upon the detection signal 122 and is used to output the first filtered signal 152 after filtering out the possible NTSC interference. The first signal processing module 160-1 generates the first processing signal 165-1 according to the first filtered signal 152 wherein the first processing signal 165-1 corresponds to a first accumulated value of the signal power of the first filtered signal 152. The second signal processing module 160-2 generates the second processing signal 165-2 according to the detection signal 122 wherein the second processing signal 165-2 corresponds to a second accumulated value of the signal power of the detection signal 122. As shown in FIG. 2, the signal processing module 160-1 further includes a square operator 162-1 for performing the square operation on the first filtered signal 152 to generate a squared signal 163-1; and an accumulator 164-1 for accumulating the squared signal 163-1 to generate a first processing signal 165-1. The components of the same name in the first and second signal processing module 160-1 and 160-2 respectively have the same operation and functionality, therefore further description of those components in the second signal processing module 160-2 is omitted for brevity. From the operations of the first and the second signal processing modules 160-1 and 160-2, the magnitude of the first processing signal 165-1 and the second processing signal 165-2 corresponds to the extent of the interference. Additionally, the comparison circuit 170 can compare the first processing signal 165-1 with the second processing signal 165-2 to generate a selection signal 172. Since the operation and functionality of the square operators 162-1 162-2 and the accumulators 164-1 164-2 are well known to those skilled in the art, further description is omitted here.

In addition, this embodiment further includes a second NTSC filter 150-2, whose operation is similar to the first NTSC filter 150-1, used for canceling the possible NTSC interference in the digital signal D1. The second NTSC filter 150-2 can perform the interference rejection filtering upon the digital signal D1 and output the second filtered signal 154. The multiplexer 180 multiplexes the digital signal D1 and the second filtered signal 154 to generate an output signal 182 according to the selection signal 172 outputted from the comparison circuit 170. In this embodiment, when the first accumulated value is greater than the second accumulated value, the selection signal 172 outputted from the comparison circuit 170 drives the multiplexer 180 to select the digital signal D1 because the interference source is not from an NTSC signal. However, when the first accumulated value is less than the second accumulated value, the selection signal 172 outputted from the comparison circuit 170 drives the multiplexer 180 to select the filtered signal 154 because the interference source is from an NTSC signal.

The embodiment applied to the ATSC digital TV system serves as an example, and is not meant to be a limitation. Any digital communication system containing the Field SYNC whose data format comprises a plurality of correlated data is capable of making use of the interference detection and interference rejection filtering disclosed in the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An interference detecting circuit for detecting interference of a digital signal, which is capable of being divided into a plurality of fields, each field including at least a first synchronization format data and a second synchronization format data, the first and second synchronization format data respectively including a plurality of sync symbols, and the interference detecting circuit comprising:

a buffering module for delaying the first synchronization format data when receiving the first synchronization format data;

a correlation arithmetic circuit coupled to the buffering module for receiving the digital signal and performing a correlation operation on the second synchronization format data and the delayed first synchronization format data to output a detection signal when receiving the second synchronization format data;

a time control circuit for generating a first control signal when receiving the first synchronization format data;

a logic control circuit coupled to the time control circuit and the correlation arithmetic circuit for generating a third control signal according to the first control signal to control the correlation arithmetic circuit; and a determining circuit for determining whether or not to perform interference rejection on the digital signal according to the result of the correlation operation.

2. The interference detecting circuit of claim 1, wherein the digital signal complies with Advanced Television Systems Committee (ATSC) specifications.

3. The interference detecting circuit of claim 2, wherein in each field, the digital signal comprises a plurality of PN63 synchronization format data, and the first and second synchronization format data of the field respectively belong to at least partial data of two PN63 synchronization format data out of the plurality of PN63 synchronization format data.

4. The interference detecting circuit of claim 3, wherein the buffering module delays the first synchronization format data by a delay time equivalent to a time period of receiving 63 symbols.

5. The interference detecting circuit of claim 4, wherein for an odd field of the digital signal, the sync symbols of the first synchronization format data of the odd field are the same as those of the second synchronization format data of the odd field.

6. The interference detecting circuit of claim 1, further comprising:
   an odd field selecting circuit for generating a second control signal when receiving an odd field of the digital signal;
   wherein the logic control circuit is utilized for generating the third control signal according to at least one of the first and second control signals to control the correlation arithmetic circuit.

7. An interference detecting circuit for detecting interference of a digital signal, which is capable of being divided into a plurality of fields, each field including at least a first synchronization format data and a second synchronization format data, the first and second synchronization format data respectively including a plurality of sync symbols, and the interference detecting circuit comprising:
   a buffering module for delaying the first synchronization format data when receiving the first synchronization format data;
   a correlation arithmetic circuit coupled to the buffering module for receiving the digital signal and performing a correlation operation on the second synchronization format data and the delayed first synchronization format data to output a detection signal when receiving the second synchronization format data; and
   a determining circuit for determining whether or not to perform interference rejection on the digital signal according to the result of the correlation operation, comprising:
       a first filter coupled to the correlation arithmetic circuit for performing interference rejection filtering on the detection signal to output a first filtered signal;
       a first interference detection module coupled to the first filter for generating a first processing signal according to the first filtered signal, wherein the first processing signal corresponds to the interference in the first filtered signal;
       a second interference detection module coupled to the correlation arithmetic circuit for generating a second processing signal according to the detection signal, wherein the second processing signal corresponds to the interference in the detection signal;
       a comparison circuit coupled to the first and second interference detection modules for comparing the first and second processing signals and generating a selection signal according to the comparison result of the first and second processing signals;
       a second filter for performing interference rejection filtering on the digital signal to output a second filtered signal; and
       a multiplexer coupled to the second filter and the comparison circuit for multiplexing the digital signal or the second filtered signal according to the selection signal.

8. The interference detecting circuit of claim 7, wherein both the first and second interference detection modules further comprise:
   a square operation unit for performing a square operation on the first filtered signal or the detection signal to generate a square signal; and
   an accumulator coupled to the square operation unit for accumulating the square signal to generate the first or second processing signal.

9. The interference detecting circuit of claim 7, wherein when the magnitude of the first processing signal is greater than that of the second processing signal, the multiplexer multiplexes the digital signal according to the selection signal; when the magnitude of the first processing signal is smaller than that of the second processing signal, the multiplexer multiplexes the second filtered signal according to the selection signal.

10. The interference detecting circuit of claim 7, wherein the first and second filters are NTSC interference rejection filters for rejecting an NTSC signal in the digital signal.

11. An interference detecting method for detecting interference of a digital signal, which is capable of being divided into a plurality of fields, each field including at least a first synchronization format data and a second synchronization format data, the first and second synchronization format data respectively including a plurality of sync symbols, and the interference detecting method comprising:
   delaying the first synchronization format data when receiving the first synchronization format data;
   performing a correlation operation on the second synchronization format data and the delayed first synchronization format data to output a detection signal when receiving the second synchronization format data;
   generating a first control signal when receiving the first synchronization format data;
   generating a third control signal according to the first control signal;
   passing the detection signal with respect to the third control signal; and
   determining whether or not to perform interference rejection on the digital signal according to the result of the correlation operation.

12. The interference detecting method of claim 11, wherein the digital signal complies with Advanced Television Systems Committee (ATSC) specifications.

13. The interference detecting method of claim 12, wherein in each field, the digital signal comprises a plurality of PN63 synchronization format data, and the first and second synchronization format data of the field respectively belong to at least partial data of two PN63 synchronization format data out of the plurality of PN63 synchronization format data.

14. The interference detecting method of claim 13, wherein the step of delaying the first synchronization format data further comprises:

delaying the first synchronization format data by a delay time equivalent to a time period of receiving 63 symbols.

15. The interference detecting method of claim 14, wherein for an odd field of the digital signal, the sync symbols of the first synchronization format data of the odd field are the same as those of the second synchronization format data of the odd field.

16. The interference detecting method of claim 11, further comprising:
generating a second control signal when receiving an odd field of the digital signal; and
generating the third control signal according to the first and second control signals to pass the detection signal with respect to the third control signal.

17. An interference detecting method for detecting interference of a digital signal, which is capable of being divided into a plurality of fields, each field including at least a first synchronization format data and a second synchronization format data, the first and second synchronization format data respectively including a plurality of sync symbols, and the interference detecting method comprising:
delaying the first synchronization format data when receiving the first synchronization format data;
performing a correlation operation on the second synchronization format data and the delayed first synchronization format data to output a detection signal when receiving the second synchronization format data; and
determining whether or not to perform interference rejection on the digital signal according to the result of the correlation operation, comprising:
performing interference rejection filtering on the detection signal to output a first filtered signal;
performing interference detection processing on the first filtered signal to generate a first processing signal, wherein the first processing signal corresponds to the interference in the first filtered signal;
performing interference detection processing on the detection signal to generate a second processing signal, wherein the second processing signal corresponds to the interference in the detection signal;
comparing the first and second processing signals and generating a selection signal according to the comparison result of the first and second processing signals;
performing interference rejection filtering on the digital signal to output a second filtered signal; and
multiplexing the digital signal or the second filtered signal according to the selection signal.

18. The interference detecting method of claim 17, wherein each of the steps of performing interference detection processing further comprises:
performing a square operation on the first filtered signal or the detection signal to generate a square signal; and
accumulating the square signal to generate the first or second processing signal.

19. The interference detecting method of claim 17, wherein the step of multiplexing the digital signal or the second filtered signal further comprises:
when the magnitude of the first processing signal is greater than that of the second processing signal, multiplexing the digital signal according to the selection signal; and
when the magnitude of the first processing signal is smaller than that of the second processing signal, multiplexing the second filtered signal according to the selection signal.

20. The interference detecting method of claim 17, wherein the steps of performing interference rejection filtering are utilized for rejecting an NTSC signal in the digital signal.

21. The interference detecting circuit of claim 1, wherein the correlation arithmetic circuit comprises a switch for passing the detection signal according to the third control signal.

22. An interference detecting circuit for detecting interference of a digital signal, which is capable of being divided into a plurality of fields, each field including at least a first synchronization format data and a second synchronization format data, the first and second synchronization format data respectively including a plurality of sync symbols, and the interference detecting circuit comprising:
a buffering module for delaying the first synchronization format data when receiving the first synchronization format data;
an arithmetic circuit, coupled to the buffering module, for receiving the digital signal and performing a correlation operation on the second synchronization format data and the delayed first synchronization format data to output a detection signal when receiving the second synchronization format data;
a control circuit for generating a control signal in response to the digital signal;
a switch, coupled to the control circuit, for passing the detection signal according to the control signal;
a determining circuit for determining whether or not to perform interference rejection on the digital signal according to the detection signal;
a filtering circuit for filtering the digital signal and thereby generating a filtered signal; and
an output circuit, coupled to the determining circuit, for outputting the digital signal or the filtered signal in accordance with a determining result of the determining circuit.

23. An interference detecting circuit for detecting interference of a digital signal, which is capable of being divided into a plurality of fields, each field including at least a first synchronization format data and a second synchronization format data, the first and second synchronization format data respectively including a plurality of sync symbols, and the interference detecting circuit comprising:
a buffering module for delaying the first synchronization format data when receiving the first synchronization format data;
an arithmetic circuit, coupled to the buffering module, for receiving the digital signal and performing a correlation operation on the second synchronization format data and the delayed first synchronization format data to output a detection signal when receiving the second synchronization format data;
a first processing circuit for generating a first processing signal according to the detection signal;
a second processing circuit for generating a second processing signal according to the detection signal;
a selection circuit, coupled to the first and second processing circuits, for generating a selection signal according to the first and second processing signals;
a filtering circuit for filtering the digital signal and thereby generating a filtered signal; and
an output circuit, coupled to the selection circuit, for outputting the digital signal or the filtered signal in accordance with the selection signal.

* * * * *